US011738785B2

(12) United States Patent
Frucht et al.

(10) Patent No.: US 11,738,785 B2
(45) Date of Patent: Aug. 29, 2023

(54) SYSTEM AND METHOD FOR DETECTING AN INTRUDER ON TRACKS

(71) Applicant: Yaakov Frucht, Akko (IL)

(72) Inventors: David Frucht, Beit Elazari (IL); Yaakov Frucht, Kibutz Ein Hamifratz (IL)

(73) Assignee: Yaakov Frucht, Akko (IL)

( * ) Notice: Subject to any disclaimer, the term of this patent is extended or adjusted under 35 U.S.C. 154(b) by 0 days.

(21) Appl. No.: 17/465,085

(22) Filed: Sep. 2, 2021

(65) Prior Publication Data

US 2022/0388554 A1 Dec. 8, 2022

Related U.S. Application Data

(63) Continuation-in-part of application No. 16/275,642, filed on Feb. 14, 2019, now abandoned.

(60) Provisional application No. 62/630,857, filed on Feb. 15, 2018.

(51) Int. Cl.
B61L 23/04 (2006.01)
G01S 17/93 (2020.01)
G01S 17/04 (2020.01)

(52) U.S. Cl.
CPC ............ B61L 23/041 (2013.01); G01S 17/04 (2020.01); G01S 17/93 (2013.01)

(58) Field of Classification Search
None
See application file for complete search history.

(56) References Cited

U.S. PATENT DOCUMENTS

| 5,910,767 A | 6/1999 | Frucht | |
|---|---|---|---|
| 2008/0073466 A1* | 3/2008 | Mardirossian | B61L 29/30 246/125 |
| 2014/0055621 A1* | 2/2014 | Shirani | H04N 7/18 348/159 |
| 2016/0039339 A1* | 2/2016 | Engel | B61L 23/041 340/435 |
| 2018/0088214 A1* | 3/2018 | O'Keeffe | G01S 7/4815 |

(Continued)

FOREIGN PATENT DOCUMENTS

| JP | 2016-203670 | 12/2016 |
| JP | 2016203670 A | * 12/2016 |
| WO | WO 2016/011274 | 1/2016 |

OTHER PUBLICATIONS

Combined Search and Examination Report for GB Patent Application No. 1902137.7, dated Aug. 16, 2019.

(Continued)

Primary Examiner — Heather R Jones
(74) Attorney, Agent, or Firm — Reches Patents

(57) ABSTRACT

A track intrusion detection system for detecting the presence of human-size intruders in a path of a railway vehicle is disclosed. The track intrusion detection system includes at least one-track module for each entrance of a tunnel railway and a server. Each track module includes at least two sensors and a signal processing unit to indicate the presence of human intruders in the area scanned by the at least two sensors. The system utilizes both measured distance and reflectivity compared with previously recorded distance and reflectivity in an empty tunnel, to assess the presence of a human-size intruder. A predefined masked area may be excluded from alert.

20 Claims, 5 Drawing Sheets

(56) References Cited

U.S. PATENT DOCUMENTS

2019/0086545 A1* 3/2019 Mooney ................. G01S 7/484

OTHER PUBLICATIONS

Office Action for U.S. Appl. No. 16/275,642, dated Jan. 8, 2020.
Office Action for U.S. Appl. No. 16/275,642, dated Sep. 29, 2020.
Office Action for U.S. Appl. No. 16/275,642, dated Mar. 3, 2021.

* cited by examiner

SYSTEM AND METHOD FOR DETECTING AN INTRUDER ON TRACKS

CROSS-REFERENCE TO RELATED APPLICATIONS

This application is a Continuation-in-Part of U.S. patent application Ser. No. 16/275,642 filed on Feb. 14, 2019, which claims the benefit of U.S. Provisional Patent Application No. 62/630,857 filed on Feb. 15, 2018, both of which are incorporated herein by reference in their entireties.

FIELD OF THE INVENTION

The present invention relates generally to an intrusion detection system and methods thereof. More specifically, embodiments of the present invention relate to an intrusion detection and notification system designed to detect intrusion of an unauthorized human in an off-limits area, such as railway tracks.

BACKGROUND OF THE INVENTION

Unauthorized entry onto the tracks generally occurs either through the platform gates or by jumping off the train platform. Intruders often climb over or around the platform gates. One solution is to install upgraded gates; however, gates alone are not able to stop people from simply jumping down from the platform and walking along the tracks into the tunnels.

Underground subway stations and tunnels present a difficult environment for conventional technologies such as motion detectors and video analytics to work effectively. Numerous variables including dim lighting, visual depth perception, moving shadows from train lights, heat, crowds, and passing trains pose complications for the way these technologies work, Inappropriate alerts or false alarms may cause unnecessary disruption to train services, so the intrusion detection system must be robust and accurate to trigger an alarm whenever a valid human intrusion occurs.

Some solutions for detecting intruders on a railway using laser sensors are known in the art. For example, JP Patent Application Publication No. 2016-203670A discloses the use of generating laser planes and comparing the reflections between two sensors associated with these laser planes. However, this solution is directed to railways in an open scene and not to railway tunnels where the challenges are more difficult to address because of reflections coming from the walls of the tunnel.

SUMMARY OF THE INVENTION

Embodiments of the present invention relate to an intrusion detection and notification system designed to detect intrusion of an unauthorized human in an off-limits area, such as railway tracks within tunnels. The system may comprise at least one track module for each entrance of a tunnel railway and a server. Each track module may comprise at least two sensors and a signal processing unit to indicate the presence of human intruders in the area scanned by at least two laser sensors configured to generate two or more detection planes parallel to the tracks and to each other, wherein at least one of the detection planes is placed above a height of a human but below a height of the railway vehicle, and wherein at least one of the detection planes is placed below a height of a human. The server is in communication with the track modules and is adapted to analyze data received from each track module and detect if human intruders are in the path of the railway vehicle.

In laser detection sensors, the probability of detection is determined by the target reflectivity. Higher reflectivity results in higher probability of detection. For safety systems it is required high detection probability. There are situations when the target reflectivity is very low and even close to zero. For example, a human wearing a very wet, low reflective plastic coat can be non-reflective and therefore the laser sensor will not detect and consequently, will not alert.

In order to solve this problem, embodiments of the present invention provide a detection method which is based on assessing the reflectivity of the objects within the scanned areas and not merely on the measuring the time of flight of the photons from the target to the sensor. It is applicable only when the background is reflective. The algorithm first maps the background. When a target is reflective the reflection from target determines the detection. Obviously, a non-reflective target does not allow detection like the reflective one. However, it covers a part of the background. This missing part of the background is used for the detection of a non-reflective target.

BRIEF DESCRIPTION OF THE DRAWINGS

The subject matter regarded as the invention is described in detail and distinctly claimed in the concluding portion of the specification. The invention, however, both as to organization and method of operation, together with objects, features, and advantages thereof, may best be understood by reference to the following detailed description when read with the accompanying drawings in which:

Figure 1:
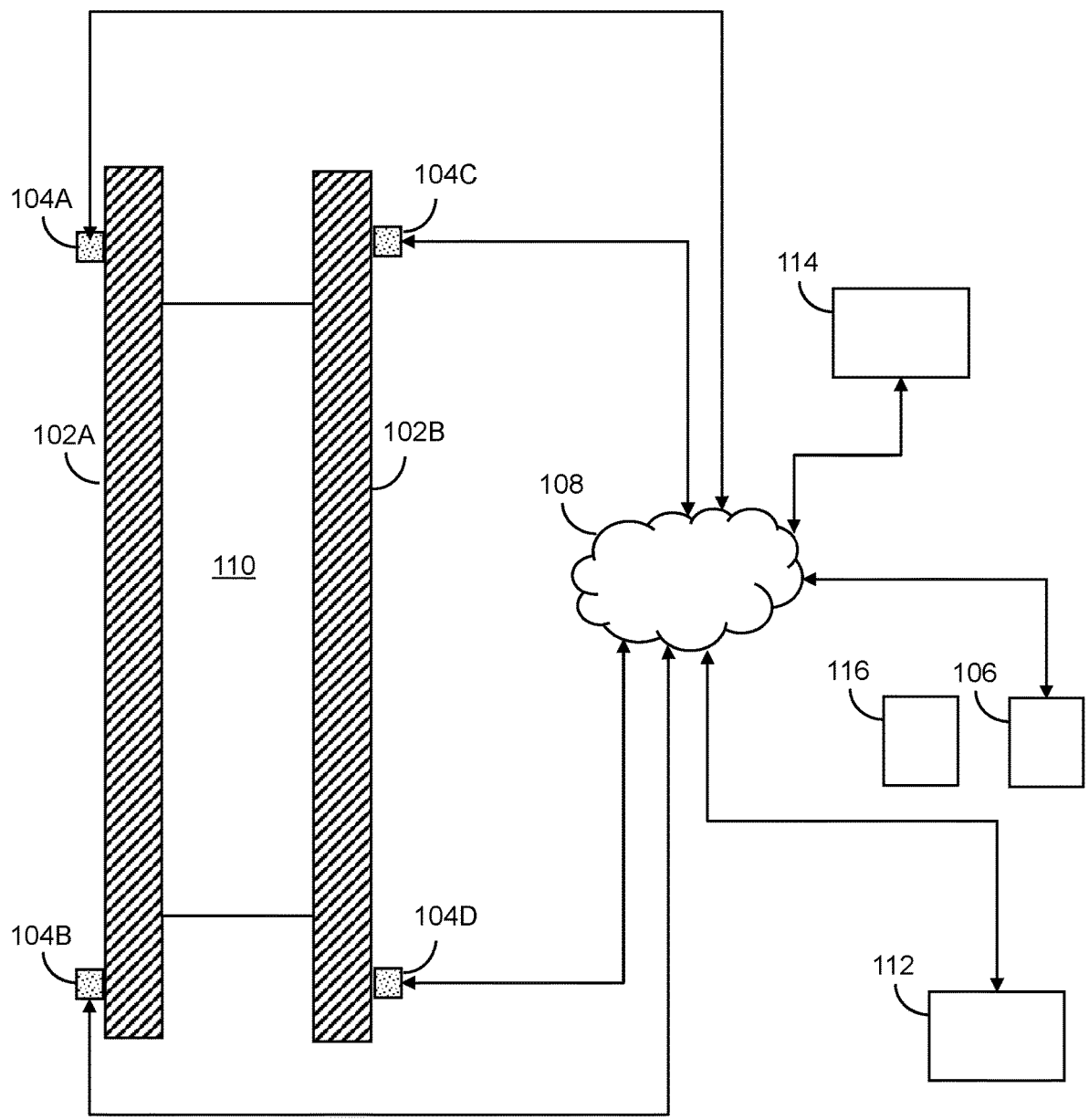
FIG. 1 is high level block diagram of the track intrusion detection system according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention are generally related to an intrusion detection system and methods thereof.

The value of the parameters specified all over the description are only examples, based on field tests.

In accordance with some embodiments of the present invention, a system for detecting a presence of human-size intruders in a path of a railway vehicle moving within a railway tunnel is provided, The system may include: at least two laser sensors configured to generate two or more detection planes parallel to the tracks and to each other, wherein at least one of the detection planes is placed above a height of a human but below a height of the railway vehicle, and wherein at least one of the detection planes is placed below a height of a human. The system may further include at least one computer processor in communication with the at least two sensors. The computer processor may be configured to calculate, based on laser reflection signals received by the sensors:

i. distances from the at least two sensors to each point along a line defined by the detection plane and the wall of the railway tunnel and other objects, intersecting the detection plane; and
  ii. reflectivity factors for said each point along said line, In accordance with some embodiments of the present invention, the computer processor may be configured to compare the aforementioned distances and the reflectivity factors, with distances and reflectivity factors recorded for the at least two sensors for an empty railway tunnel, in a calibration or training sessions, to determine whether human-size intruders are in the path of the railway vehicle. Comparing can be implemented by subtracting the values of measured and recorded distance and reflectivity.

In accordance with some embodiments of the present invention, the computer processor may be further configured to exclude from detection, objects that are located within a predefined masked area of the railway tunnel.

In accordance with some embodiments of the present invention, the laser sensors may include a pulse laser source, wherein the reflectivity is measured by measuring the impulse response of a reflection over time, of a laser pulse transmitted by the laser sensor of the wall of the railway tunnel.

In accordance with some embodiments of the present invention, the predefined masked area of the railway tunnel may be determined based on patterns linked to distance and/or reflectivity.

In accordance with some embodiments of the present invention, the computer processor may be adapted to activate an alarm when it is determined by the server that human-size intruders are in the path of the railway vehicle.

FIG. 1 depicts a high-level block diagram illustrating track intrusion system 100, in accordance with embodiments of the present disclosure. In exemplary embodiments, where the station platform includes two tracks 102A and 102B, four track modules 104A-104D are installed (see FIG. 2 for more details on the track module), connected to network components either via a wired communication or a wireless connection, or the like. Each track module may provide outputs to a server 106 through an Internet Protocol (IP) interface, communicating through network 108. Although trains are described herein, some embodiments of the present disclosure may be used with any transportation system that utilizes a vehicle running on a track, rail, and or the like to transport goods, passengers, and/or the like. Systems in accordance embodiments of the present disclosure may comprise any number of rails consistent with the system, for example, one, two, three, or four rails, or the like.

In accordance with exemplary embodiments, the design of a track intrusion detection system may generally depend on the placement of the track modules 104A-104D, near the track or in the train station, or the like, and analysis of the output data from the track modules 104A-104D. In an exemplary embodiment shown at FIG. 1, track modules may be installed at each end of a station platform 110, for a total of four track modules per platform.

According to some embodiments of the present invention, the least two laser sensors are configured to generate two or more detection planes parallel to the tracks and to each other, wherein at least one of the detection planes is placed above a height of a human but below a height of the railway vehicle, and wherein at least one of the detection planes is placed below a height of a human.

According to some embodiments of the present invention, the at least two sensors are laser sensors facing perpendicular to the track towards the platform and configured to generate two or more detection planes parallel to the platform and to each other.

According to some embodiments of the present invention, at least one of the sensors is located above a height of a human, and wherein at least one of the sensors is located below a height of a human, According to some embodiments of the present invention, server 106 is in communication with the at least one-track module, the server comprising: one or more processors; and a memory.

According to some embodiments of the present invention, the one or more processors is configured to determine, based on the laser sensors: distances from the laser sensor to each point along a line defined by an intersection between the detection plane and a wall of the railway tunnel, reflectivity factors for said each point along the line defined by the intersection between the detection plane and the wall of the railway tunnel.

According to some embodiments of the present invention, server 106 is configured to analyze said distances and said reflectivity factors, compared with distances and reflectivity factors recorded for an empty railway tunnel, to detect if human intruders are in the path of the railway vehicle.

wherein the at least one server 106 is configured to analyze said distances and said reflectivity factors, compared with distances and reflectivity factors recorded for an empty railway tunnel, to detect if human intruders are in the path of the railway vehicle.

According to some embodiments, server 106 may be adapted to activate an alarm or other warning mechanism when it is determined by the server 106 that human intruders are in the path of the railway vehicle (based on data information received from the track modules 104A-104D).

According to some other embodiments, server 106 may be assigned as a master server and provides monitoring of all stations equipped with track modules.

The placement of the track modules may provide redundant and overlapping detection areas, or the like, thereby providing full coverage of the intrusion areas where a person may intrude upon. The track intrusion detection system works both on the platform site and deep inside the tunnels to show where the human intruder is, if the human intruder returns back to the platform or continue deeper into the tunnel. The track intrusion system according to the present disclosure is not affected by approaching train headlights or low light conditions.

In some embodiments, IP video from track modules 102A-102D (see FIG. 2 for more details on the track modules) may be tied into a video management server (VSM) 114 for continuous recording.

In some embodiments, the intrusion detection system may be configured to communicate with remote devices 112, though network 108.

Figure 2:
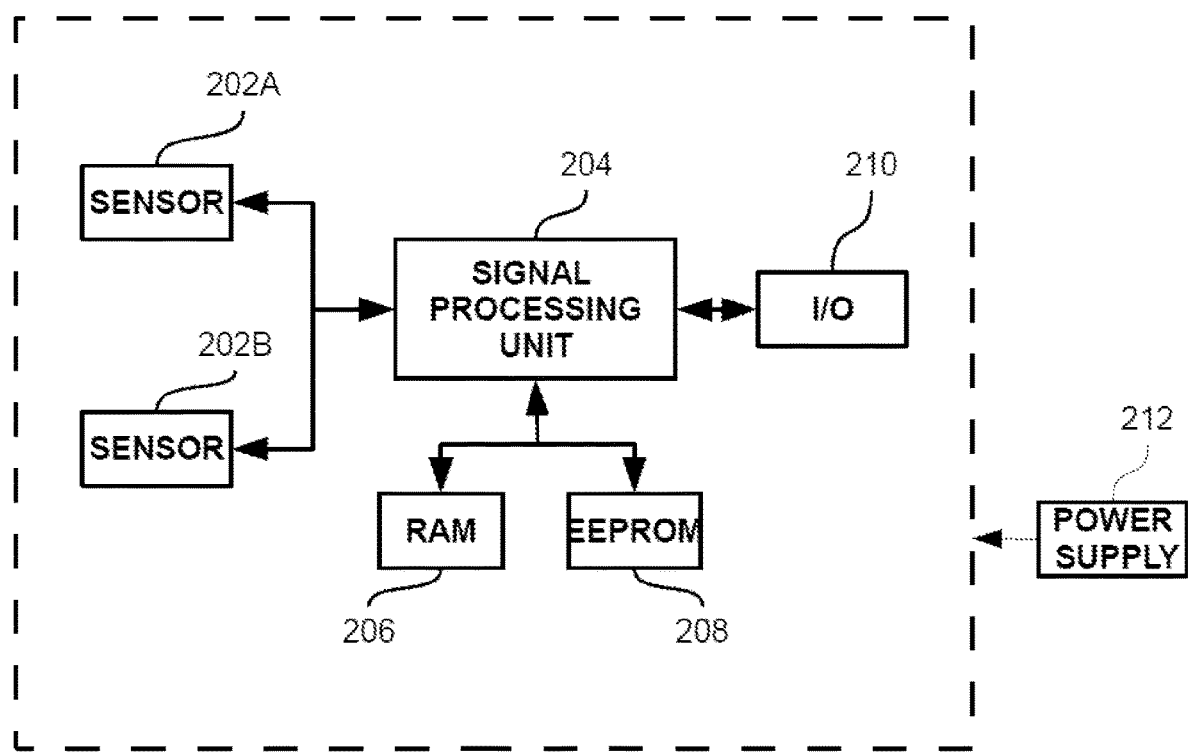
FIG. 2 is high level block diagram of a track intrusion module according to some embodiments of the present invention.

FIG. 2 depicts a high-level block diagram of a track intrusion module, in accordance with embodiments of the present disclosure. According to this embodiment, each track module is a standalone sub-system which consists of two sensors 202A and 202B, and a signal processing unit 204. Signal processing unit 204 may detect the presence of human intruders in the area scanned by the two sensors and the distance of the human intruders from the track module in which the two sensors 202A and 202B are included.

According to some embodiments, the two sensors are lidar sensors, the laser used a class 1 control laser with a beam width of preferably 1 milliradian, which allows a search path radius of 100 meters, yet is safe for operation in the vicinity of humans.

In accordance with exemplary embodiments, the design of a track intrusion detection system may generally depend on the placement of the two sensors 202A and 202B and the output data from the two sensors 202A and 202B. In exemplary embodiments, the two sensors are being placed at different heights, above the path of the railway vehicle. By way of example, the two sensors are stacked vertically approx. 3' and 10' above the rail, facing perpendicular to the track towards the platform, with clear view of the platform track area on one side and the tunnel on the opposite side. This enables the system to provide continuous tracking of intrusion activity from the platform extending into the tunnels and vice-versa. The sensors may provide 180° detection corridor, preferably extending up to fifty meters in both directions from the end of the station platform to cover the track area in front of the station platform and extending into the tunnel.

According to some embodiment, the signal processing unit includes a computer and an algorithm for analysis of the signals to detect the presence of a human intruder in the area scanned by the two sensors, reduce the number of false alarms and calculate the distance of the human intruders from the track module in which the two sensors 202A and 202B are included. The following algorithm is an example of an algorithm and is not meant to be limiting in any way. A similar algorithm is detailed in U.S. Pat. No. 5,910,767. The first step in the detection process is the measurement of the time of flight of the signal from the sensor to object and back to the sensor. The time of flight determines the distance at each angle of the scanned sector, according to the sensor designated angular resolution. The principle of operation and description of the main parameters are as follows:

The sensor, at first few scans (hereinafter "FLIP" period), collects range statistics about each point. On the basis of this statistic, the algorithm creates a threshold of protected area, Consequently, the algorithm switches to detection mode, On detection mode, the algorithm detects points, in which range is transgress the bounds of the threshold, analyses them, and if all the criteria are satisfied, a human intruder is detected and an alarm may be generated The algorithm is adaptive to environmental changes and pliable for many kinds of detection configurations, e.g.: Offset—parameter which defines linear (distance) noise level; Delta—parameter which defines distance standard deviation of all successive points, falling out of threshold; Width—parameter, which defines minimal number of all successive points, that falling out of threshold multiplied by distance to target, needed to generate alarm; Order—parameter, which defines angular noise level; SST—scan to scan tracking its faculty of algorithm to prove right truth of the target, during number of scans; FLIP—parameter which defines number of scans in "learn" period. By learning, it means building the map of the environment and its changing statistics; SUN—parameter, which defines number of scans for adaptation to sunrise/sunset. The algorithm is also in charge with logic detection of humans and filtration out of trains. The algorithm correlates information from the two sensors about the size of the detected objects, location, features of the shape and timing.

Subsequently, the object features are analyzed and if they pass the detection criteria, information data e.g., the detection of human intruders, location of the intruders, the track module location are sent to the server 106.

In some embodiments, the track module is integrated with a 360° PTZ camera (not shown), with a native protocol a driver unit for pointing the PTZ camera to a point of interest in an area of interest. PTZ camera is driven by the sensors 202A and 202B of the track module to confirm detection and manually scan the tunnel.

In another embodiment, the signal processing unit is adapted to evaluate the data and the information gained from the PTZ camera and the two sensors 202A and 202B, and to automatically steer the PTZ camera to the location of the human intruders to confirm the detection and to provide an automated video tracking and transfer it to the server 108 and/or the VMS 114 ("slew to cue" capability).

According to some embodiments, the track intrusion detection system includes a display unit 116 to view the videos received from a track module and review indications sent by the track module.

According to some embodiments, the screen is based on black screen technology, and by so, the display unit 116 is configured to switch between an inactivated state corresponding to a black scree of the display unit, and in activated stated in which a screen is displayed on the display unit when triggered by the indication of the human intruders sent by any track module. Each track module may provide outputs to a server 106 through an IP interface, communicating through network 108. The outputs to the server 106 may include different information data such as the track module number, the track module location, the station platform number, the location of the human intruders, time of the intrusion, videos captured by the PTZ camera.

Embodiments of the present invention provide a detection method which is based on assessing the reflectivity of the objects within the scanned areas and not merely on the measuring the time of flight of the photons from the target to the sensor. It is applicable only when the background is reflective. The algorithm first maps the background. When a target is reflective the reflection from target determines the detection. Obviously, a non-reflective target does not allow detection like the reflective one. However, it covers a part of the background. This missing part of the background is used for the detection of a non-reflective target.

Figure 3:
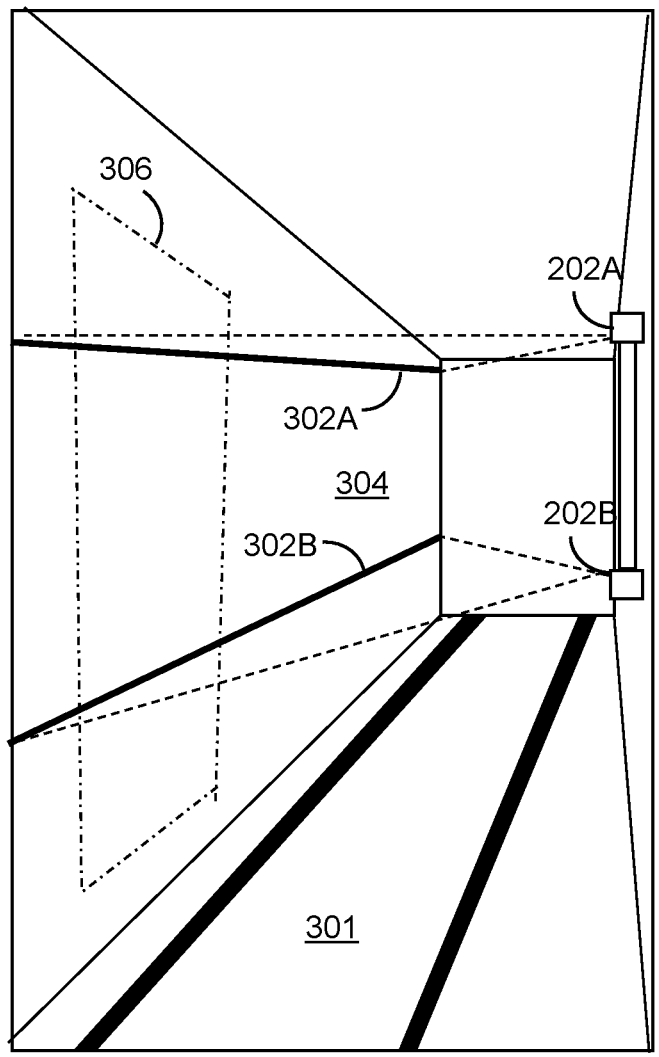
FIG. 3 is a schematic diagram illustrating the placement of the sensors within a track intrusion module.

FIG. 3 is a schematic diagram illustrating the placement of the sensors within a track intrusion module. The track 310 are located within a tunnel. On one wall of the tunnel, two laser sensors 202A and 202B are placed one above another. Sensors 202A and 202B each generate a laser plane defined by the dashes lines and having a respective intersecting line 302A and 302B with wall 304 opposite the wall on which sensors 202A and 202B are mounted. As explained above, distances and reflectivity along intersecting lines 302A and 302B are measured and compared with records takes along these lines 302A and 302B in an empty tunnel. Additionally, a specified masked area 306 can be predefined so that it is excluded from detection and alarm. This way maintenance activity by human or robots can take place without false alarms.

Figure 4A:
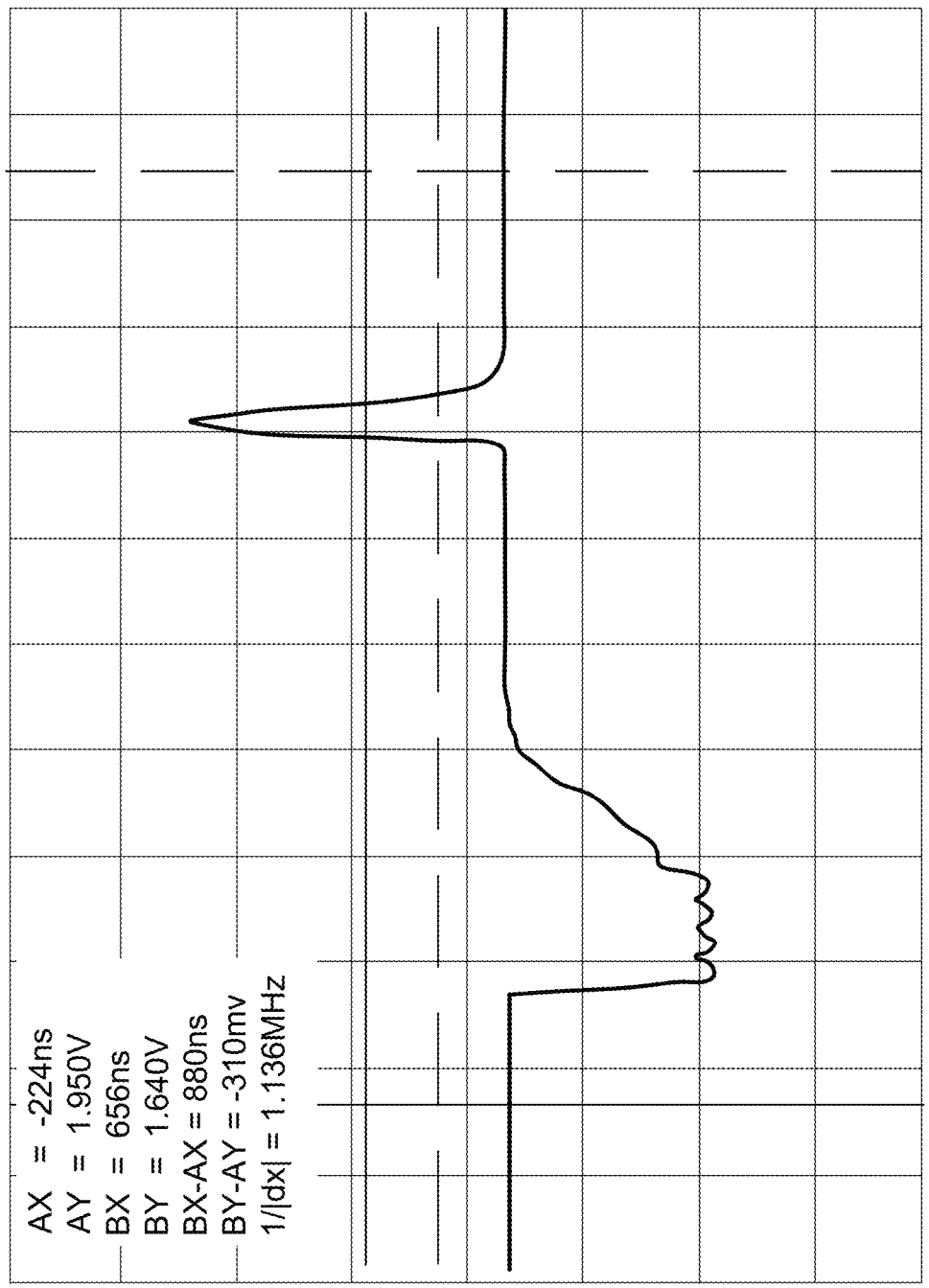
FIGS. 4A and 4B are snapshots from a display of a scope illustrating how reflectivity factor may be measured using the laser sensors in accordance with some embodiments of the present invention.
Figure 4B:
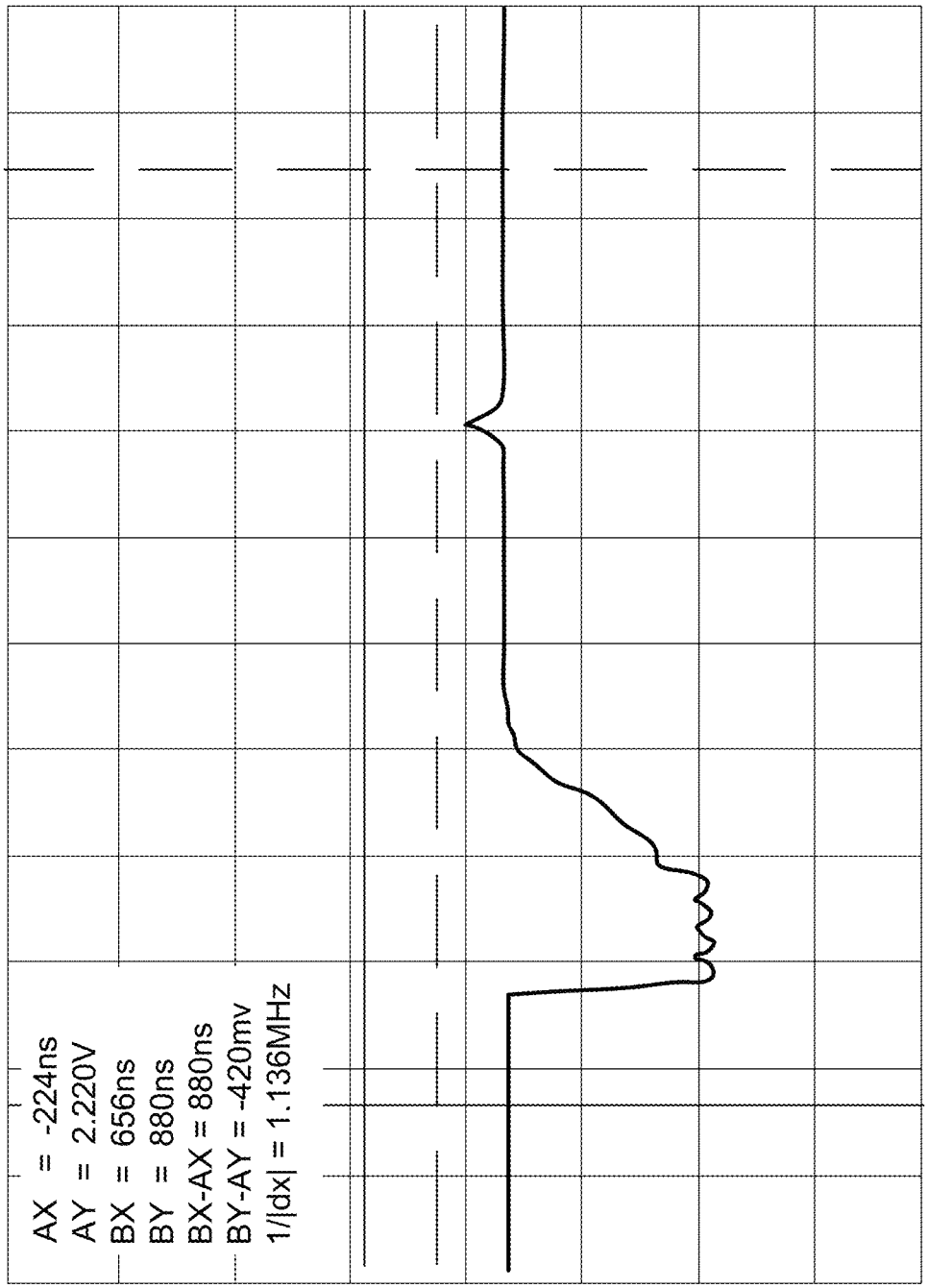

FIGS. 4A and 4B are snapshot from a display of a scope illustrating the how reflectivity factor is measured using the laser sensors in accordance with some embodiments of the present invention. In both figures, the intensity over time of a reflection of a laser pulse as it is reflected of the wall of the railway tunnel is being measured. In FIG. 4A, a surface having low reflectivity factor is demonstrated whereas in FIG. 4B, a surface having high reflectivity factor is demonstrated. Being able to distinguish between surfaces of low-reflectivity and high-reflectivity is crucial when trying to assess whether a person wet clothes (e.g., due to rain) is present in the scene.

According to some embodiments, the sensors are remotely software upgradeable, and remotely configurable.

According to some embodiments, hands-free operation provides operators with station name, track module location, and the operators are able to manually select any station of interest to view video and review alarms.

The track intrusion detection system may be capable of detecting up to sixteen human intruders simultaneously.

It should be noted that the method according to embodiments of the present invention may be stored as instructions in a computer readable medium to cause processors, such as central processing units (CPU) to perform the method. Additionally, the method described in the present disclosure can be stored as instructions in a non-transitory computer readable medium, such as storage devices which may include hard disk drives, solid state drives, flash memories, and the like. Additionally, non-transitory computer readable medium can be memory units.

In order to implement the method according to embodiments of the present invention, a computer processor may receive instructions and data from a read-only memory or a random-access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, JavaScript Object Notation (JSON), C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function (s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting of" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional elements.

It is to be understood that where the claims or specification refer to "a" or "an" element, such reference is not be construed that there is only one of that elements.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for detecting a presence of human-size intruders in a path of a railway vehicle moving on tracks within a railway tunnel, the system comprising:
   at least two laser sensors configured to generate two or more detection planes parallel to the tracks and to each other, wherein at least one of the detection planes is placed above a height of a human but below a height of the railway vehicle, and wherein at least one of the detection planes is placed below a height of a human, and
   at least one computer processor in communication with the at least two sensors, said computer processor configured to calculate, based on laser reflection signals received by the sensors:
   iii. distances from the at least two sensors to each point along a line defined by the detection plane and the wall of the railway tunnel and other objects, intersecting the detection plane; and
   iv. reflectivity factors for said each point along said line, wherein the at least one computer processor is configured to compare said distances and said reflectivity factors, with distances and reflectivity factors recorded for said at least two sensors for an empty railway tunnel, to determine whether human-size intruders are in the path of the railway vehicle,
   wherein the computer processor is further configured to exclude from detection, objects that are located within a predefined masked area of the railway tunnel.

2. The system according to claim 1, wherein the laser sensors comprise a pulse laser source, wherein the reflectivity is measured by measuring the impulse response of a reflection over time, of a laser pulse transmitted by the laser sensor of the wall of the railway tunnel.

3. The system according to claim 1, the predefined masked area of the railway tunnel is determined based on patterns linked to distance and/or reflectivity.

4. The system according to claim 1, wherein the computer processor is adapted to activate an alarm when it is determined by the at least one computer processor that human-size intruders are in the path of the railway vehicle.

5. The system according to claim 1, wherein the at least two laser sensors are lidar sensors, adapted to detect the distance of the human-size intruders to the at least two sensors.

6. The system according to claim 1, wherein the data received from the at least two laser sensors are in a form of Internet Protocol (IP) packets.

7. The system according to claim 6, wherein the at least one computer processor further comprises a display unit to view the videos received from the at least one-track module and review the indications sent by the at least one-track module.

8. The system according to claim 1, wherein said at least one computer processor includes a computer, an algorithm to detect the human-size intruders and eliminate false positives from the railway vehicle.

9. The system according to claim 1, wherein each of the least one track module further comprises a PTZ camera with a native protocol and a driver unit for pointing the camera to a point of interest in an area of interest, wherein the at least one computer processor unit is further adapted to evaluate the data and the information gained from the PTZ camera and the at least two sensors and to automatically steer the PTZ camera to the location of the human-size intruders to confirm the detection and to provide an automated video tracking and transferring it to the at least one computer processor.

10. The system according to claim 1, comprising a display unit is configured to switch between an inactivated state corresponding to a black screen of the display unit and an activated state in which a screen is displayed on the display unit when triggered by the indication of the human-size intruders sent by the at least one-track module.

11. The system according to claim 1, wherein the system is configured to detect up to sixteen human-size intruders simultaneously.

12. The system according to claim 1, wherein the at least two sensors are software upgradeable and remotely configurable.

13. The system according to claim 1, wherein continuous plotting of the human-size intruders on a station map is displayed on a display unit of the system when the display unit is in activated state.

14. A method for detecting a presence of human-size intruders in a path of a railway vehicle moving on tracks within a railway tunnel, the method comprising:
   locating at least two laser sensors configured to generate two or more detection planes parallel to the tracks and to each other, wherein at least one of the detection planes is placed above a height of a human but below a height of the railway vehicle, and wherein at least one of the detection planes is placed below a height of a human; and
   calculating, using a computer processor, based on laser reflection signals received by the sensors:
   i. distances from the at least two sensors to each point along a line defined by the detection plane and the wall of the railway tunnel and other objects, intersecting the detection plane; and
   ii. reflectivity factors for said each point along said line;
   comparing said distances and said reflectivity factors, with distances and reflectivity factors recorded for said at least two sensors for an empty railway tunnel, to determine whether human-size intruders are in the path of the railway vehicle; and
   excluding from detection, objects that are located within a predefined masked area of the railway tunnel.

15. The method according to claim 14, wherein the laser sensors comprise a pulse laser source, wherein the reflectivity is measured by measuring the impulse response of a reflection over time, of a laser pulse transmitted by the laser sensor of the wall of the railway tunnel.

16. The method according to claim 14, wherein the predefined masked area of the railway tunnel is determined based on patterns linked to distance and/or reflectivity.

17. The method according to claim 14, further comprising activating an alarm when it is determined by the least one computer processor that human-size intruders are in the path of the railway vehicle.

18. The method according to claim 14, wherein the at least two laser sensors are lidar sensors, adapted to detect the distance of the human-size intruders to the at least two sensors.

19. The method according to claim 14, wherein the data received from the at least two laser sensors are in a form of Internet Protocol (IP) packets.

20. The method according to claim 14, wherein said at least one computer processor includes a computer, an algorithm to detect the human-size intruders and eliminate false positives from the railway vehicle.

* * * * *